US012560001B2

(12) United States Patent
Jeong et al.

(10) Patent No.: US 12,560,001 B2
(45) Date of Patent: Feb. 24, 2026

(54) CHARGING DOOR ASSEMBLY OF VEHICLE

(71) Applicants: Hyundai Motor Company, Seoul (KR); Kia Corporation, Seoul (KR); SL Corporation, Daegu (KR)

(72) Inventors: Yong-Won Jeong, Gyeonggi-Do (KR); Jeong-Ho Byeon, Gyeonggi-Do (KR); Chan Joo Moon, Gyeonggi-do (KR); Hyung-Jin Park, Incheon (KR); Ji-Hun Kim, Gyeonggi-do (KR); Dong-Ho Ha, Daegu (KR)

(73) Assignees: Hyundai Motor Company, Seoul (KR); Kia Corporation, Seoul (KR); SL Corporation, Daegu (KR)

( * ) Notice: Subject to any disclaimer, the term of this patent is extended or adjusted under 35 U.S.C. 154(b) by 616 days.

(21) Appl. No.: 18/077,900

(22) Filed: Dec. 8, 2022

(65) Prior Publication Data

US 2023/0349205 A1 Nov. 2, 2023

(30) Foreign Application Priority Data

Apr. 28, 2022 (KR) ........................ 10-2022-0052803

(51) Int. Cl.
*E05B 83/34* (2014.01)
*B60L 53/16* (2019.01)
*H01R 13/447* (2006.01)

(52) U.S. Cl.
CPC .............. *E05B 83/34* (2013.01); *B60L 53/16* (2019.02); *H01R 13/447* (2013.01); *H01R 2201/26* (2013.01)

(58) Field of Classification Search
CPC ............................ B60L 53/16; H01R 2201/26
USPC ......................................................... 296/97.22
See application file for complete search history.

(56) References Cited

U.S. PATENT DOCUMENTS

| | | | | |
|---|---|---|---|---|
| 5,658,036 A | * | 8/1997 | Benoist | B60K 15/05 |
| | | | | 296/97.22 |
| 8,740,283 B2 | * | 6/2014 | Yamamaru | B60K 1/04 |
| | | | | 296/136.01 |
| 9,656,561 B2 | * | 5/2017 | Yoo | B60L 53/16 |
| 9,662,990 B2 | * | 5/2017 | Jeong | B60K 1/00 |

(Continued)

FOREIGN PATENT DOCUMENTS

| | | | | |
|---|---|---|---|---|
| CN | 118205633 A | * | 6/2024 | ............. B62D 25/24 |
| CN | 221903205 U | * | 10/2024 | |

(Continued)

*Primary Examiner* — Hilary L Gutman
(74) *Attorney, Agent, or Firm* — Fox Rothschild LLP

(57) ABSTRACT

Disclosed herein is a charging door assembly of a vehicle, which improves operability when opened and reduces a protruding amount. The charging door assembly of a vehicle according to the present disclosure includes a charging door configured to open and close a charging port formed on a panel of a vehicle body, a main link hinge-coupled to the vehicle body and an inner surface of the charging door, and a sub-link hinge-coupled to the vehicle body and the inner surface of the charging door at a position spaced apart from the main link. After the charging door is moved to the outside of the panel, the inner surface of the charging door is opened while maintaining a state in which the inner surface of the charging door is located within a predetermined distance from the panel.

19 Claims, 18 Drawing Sheets

(56)            References Cited

U.S. PATENT DOCUMENTS

| | | | | |
|---|---|---|---|---|
| 9,688,137 | B2 * | 6/2017 | Takahashi | B60K 15/05 |
| 10,245,943 | B2 * | 4/2019 | Mori | B60K 15/05 |
| 10,352,078 | B2 * | 7/2019 | Geissenhoener | E05F 1/10 |
| 10,759,290 | B2 | 9/2020 | Sha | |
| 11,407,305 | B2 * | 8/2022 | Beck | B60K 15/05 |
| 11,975,603 | B2 * | 5/2024 | Sun | E05B 81/42 |
| 12,006,751 | B2 * | 6/2024 | Schaafsma | B60K 15/05 |
| 2006/0010769 | A1 * | 1/2006 | Pelz | B64C 1/1407 |
| | | | | 49/141 |
| 2011/0140477 | A1 * | 6/2011 | Mihai | B60K 15/05 |
| | | | | 296/97.22 |
| 2011/0285165 | A1 * | 11/2011 | Baba | B60K 15/05 |
| | | | | 296/97.22 |
| 2011/0285166 | A1 * | 11/2011 | Baba | E05D 11/1007 |
| | | | | 296/97.22 |
| 2013/0153257 | A1 * | 6/2013 | Yamamaru | H01R 13/447 |
| | | | | 174/67 |
| 2013/0157485 | A1 * | 6/2013 | Yamamaru | B60K 15/04 |
| | | | | 174/67 |
| 2015/0102627 | A1 * | 4/2015 | Pickartz | B60K 15/05 |
| | | | | 296/97.22 |
| 2015/0375630 | A1 | 12/2015 | Jeong et al. | |
| 2022/0134874 | A1 * | 5/2022 | Tanaka | B60K 15/05 |
| | | | | 296/97.22 |
| 2022/0213728 | A1 * | 7/2022 | Ilardo | B60K 15/05 |
| 2023/0135036 | A1 * | 5/2023 | Kaneko | B60K 15/05 |
| | | | | 296/97.22 |
| 2023/0151651 | A1 * | 5/2023 | Hegwein | E05B 81/20 |
| | | | | 296/97.22 |
| 2025/0188787 | A1 * | 6/2025 | Feng | E05D 3/06 |

FOREIGN PATENT DOCUMENTS

| | | | | |
|---|---|---|---|---|
| FR | 3157285 | A1 * | 6/2025 | E05D 3/16 |
| KR | 2000-0012746 | A | 3/2000 | |
| KR | 20-0463258 | | 10/2012 | |
| KR | 10-2017-0076371 | A | 7/2017 | |
| KR | 10-2200062 | B1 | 1/2021 | |
| KR | 2021-0001408 | A | 1/2021 | |
| KR | 10-2249860 | B1 | 5/2021 | |

* cited by examiner

CHARGING DOOR ASSEMBLY OF VEHICLE

CROSS-REFERENCE(S) TO RELATED APPLICATIONS

This application claims under 35 U.S.C. § 119(a) the benefit of Korean Patent Application No. 10-2022-0052803, filed on Apr. 28, 2022, which is incorporated herein by reference in its entirety.

BACKGROUND OF PRESENT DISCLOSURE

Technical Field

Exemplary embodiments of the present disclosure relate to a charging door assembly of a Vehicle, which Improves Operability when Opened and Reduces a Protruding Amount.

BACKGROUND

A door for supplying energy required for driving of a vehicle is installed outside the vehicle.

For example, a fuel door for filling fuel into a fuel tank is installed in an internal combustion engine vehicle, and a charging door for connecting a charger is installed in an electric vehicle or a plug-in hybrid vehicle.

Generally, the charging door has a same structure of the fuel door, or a partially modified structure of the fuel door. Thus, as shown in FIG. 1, in the charging door, a charging door 121 is connected to a housing 112 through a gooseneck hinge 122 so that the charging door 121 is hinge-coupled to the housing 112, and the charging door 121 is locked or unlocked by an opener 131 installed in the housing 112.

Since the charging door 121 is hinge-coupled to the housing 112, when the charging door 121 is opened, a protruding amount of the charging door 121 has to be large. Recently, in order to improve a charging speed, since a size of a charging terminal is increased inside a charging connector 150 and a separate communication terminal for charging control is also installed, a size of the charging door 121 is increased.

As described above, as the size of the charging terminal is increased, when the charging door 121 is opened, a protruding amount D of the charging door 121 is increased.

Since the protruding amount D of the charging door 121 is increased, there is a problem in that rigidity is insufficient when the charging door 121 is opened and damage of the charging door 121 is concerned.

SUMMARY OF PRESENT DISCLOSURE

An embodiment of the present disclosure is directed to a charging door assembly of a vehicle, which prevents a protruding amount from a surface of the vehicle from being increased even when a size of a charging door is increased.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, there is provided a charging door assembly of a vehicle, which includes a charging door configured to open and close a charging port formed in a panel of a vehicle body, a main link hinge-coupled to the vehicle body and an inner surface of the charging door, and a sub-link hinge-coupled to the vehicle body and the inner surface of the charging door at a position spaced apart from the main link, wherein the charging door is configured to be moved to the outside of the panel, and then is configured to be opened while maintaining a state in which the inner surface of the charging door is located within a predetermined distance from the panel.

One end of the main link may be hinge-coupled to one end of the sub-link, and the charging door assembly may further include a pop-up operating part configured to pop the charging door up from the panel toward the outside of the panel.

The pop-up operating part may include a first pop-up operating link and a second pop-up operating link of which middle portions are hinge-coupled while intersecting each other, and a pop-up operating bar is hinge-coupled to the main link and the sub-link, and is popped up while interlocking with the first pop-up operating link and the second pop-up operating link according to an angle change therebetween.

One end of the first pop-up operating link and one end of the second pop-up operating link may each be hinge-coupled to the vehicle body, and the other end of the first pop-up operating link and the other end of the second pop-up operating link may each be hinge-coupled to the pop-up operating bar, wherein, when the pop-up operating bar is popped up, the other end of the first pop-up operating link and the other end of the second pop-up operating link may be hinge-coupled to slide in a direction perpendicular to a pop-up direction of the pop-up operating bar.

A slit may be formed in the pop-up operating bar to guide the other end of the first pop-up operating link to be guided by the slit.

The charging door assembly may further include a driving shaft configured to pass through one end of the main link and one side of the pop-up operating bar to hinge-couple the main link to the pop-up operating bar, and a sub-shaft configured to pass through one end of the sub-link and the other side of the pop-up operating bar to hinge-couple the sub-link to the pop-up operating bar.

The charging door assembly may further include a driving motor configured to rotate the driving shaft.

The charging door assembly may further include a driving gear rotated by the driving motor, and a guide gear engaged with the driving gear and configured to sequentially perform a movement operation for moving the driving shaft by as much as a predetermined distance and a rotation operation for rotating the driving shaft.

The charging door assembly may further include a first guide bar and a second guide bar connected to positions spaced apart from each other of the guide gear at an end of the driving shaft and integrally formed with the driving shaft to be parallel thereto, and a guide plate in which a guide groove is formed to allow the guide gear to sequentially perform the movement operation and the rotation operation.

A gear may be formed in a partial section of the guide gear, wherein the gear is formed to have a predetermined length and engaged with the driving gear.

A first guide groove configured to guide the first guide bar and a second guide groove configured to guide the second guide bar may be formed in the guide plate, and a straight section for a movement operation of the driving shaft and a rotating section for a rotation operation of the driving shaft may be continuously formed in each of the first guide groove and the second guide groove.

US 12,560,001 B2

3

The charging door assembly may further include a first support link having one end hinge-coupled to one side of the main link, and a second support link having one end connected to the other end of the first support link and the other end hinge-coupled to the inner surface of the charging door.

The charging door assembly may further include a release shaft manipulated by a user, and a release gear engaged with the release shaft and the driving gear and configured to transmit a rotating force, which is input from the release shaft, to the driving gear.

The charging door assembly may further include a driving gear rotated by the driving motor, and an external gear engaged with the driving gear and configured to sequentially perform a movement operation for moving the driving shaft by as much as a predetermined distance and a rotation operation for rotating the driving shaft.

A straight section for moving the external gear by as much as a predetermined distance due to the rotation of the driving gear may be formed on a partial outer portion of the external gear, and a rotating section for rotating the external gear may be formed to be connected to the straight section in the external gear.

The charging door assembly may further include a base which is fixed to the vehicle body, in which a space is formed, and which accommodates a portion in which the main link and the sub-link are connected to the vehicle body.

The charging door assembly may further include a cover configured to cover the base.

A slit may be formed in the base to guide one end of the second pop-up operating link to be guided by the slit.

As discussed, the method and system suitably include use of a controller or processer.

In another embodiment, vehicles are provided that comprise an apparatus as disclosed herein.

BRIEF DESCRIPTION OF THE DRAWINGS

Figure 2:
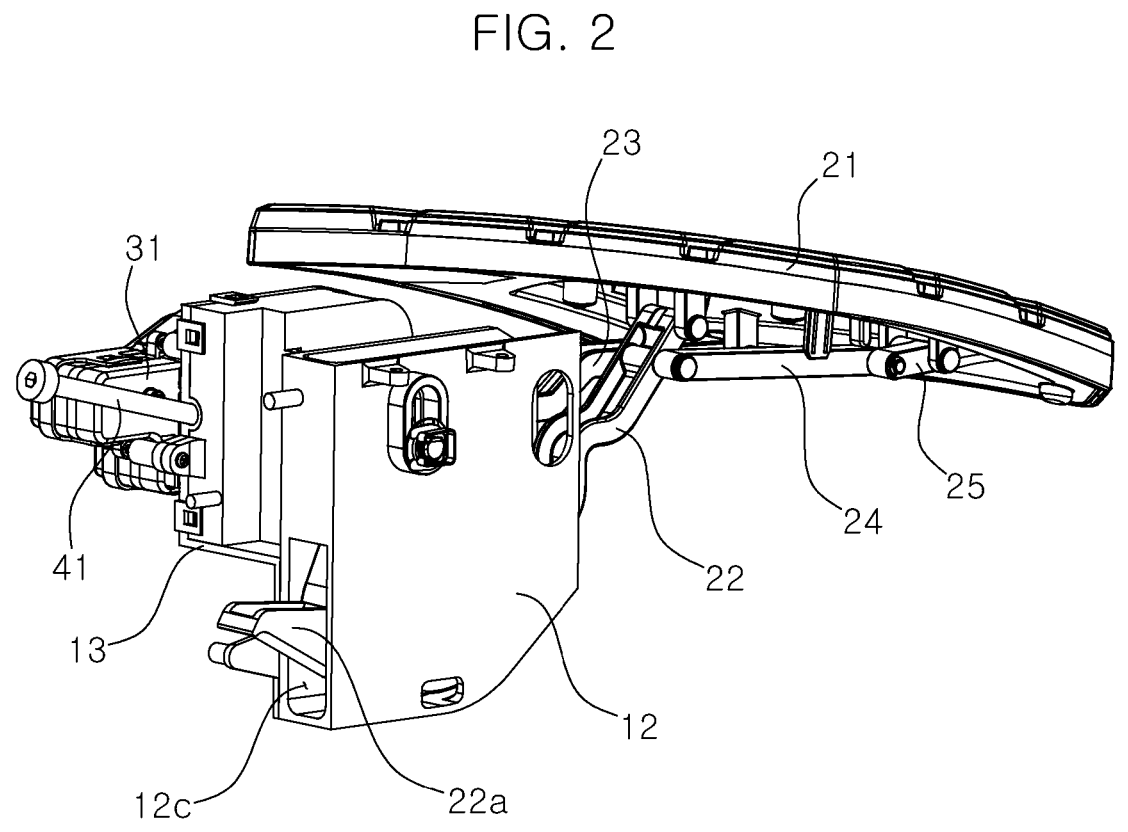

FIG. 2 is a perspective view illustrating a charging door assembly of a vehicle according to the present disclosure.

FIGS. 4B and 4C are plan views illustrating states of a guide plate and a pop-up operating bar in the state in which the charging door in the charging door assembly of a vehicle is closed according to the present disclosure.

4

Figure 8A:
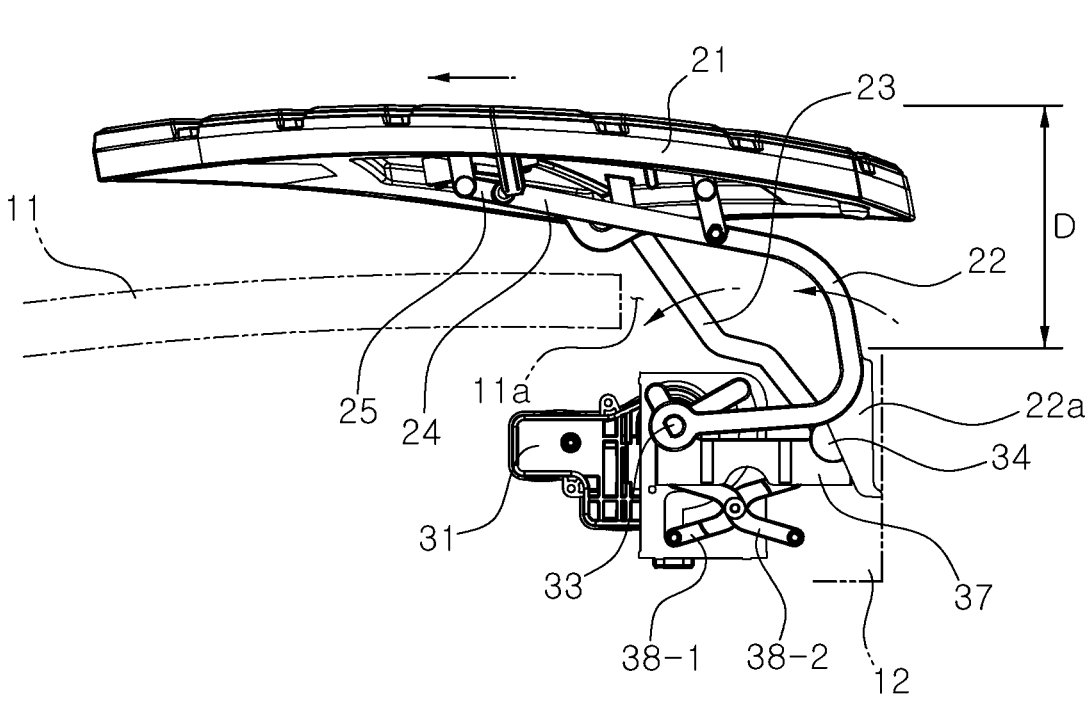

FIG. 8A is a plan view illustrating a state in which a charging door in the charging door assembly of a vehicle is opened according to the present disclosure.

Figure 8B:
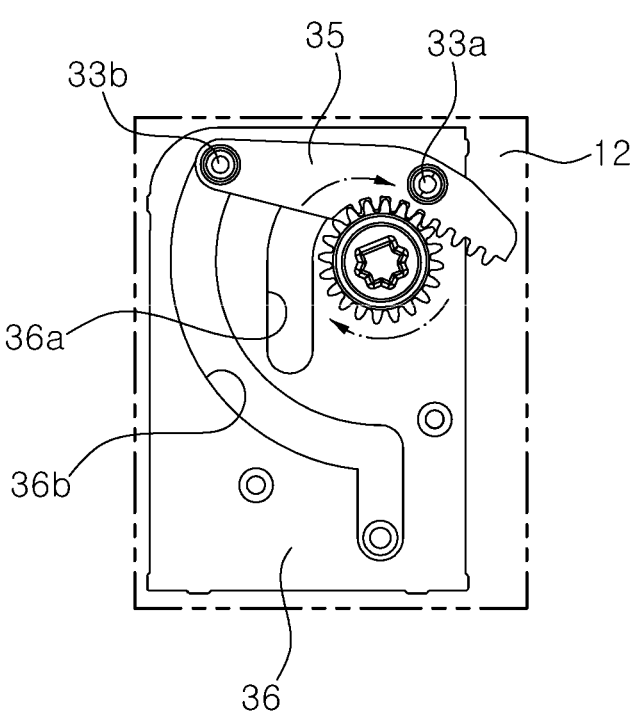

FIG. 8B is a plan view illustrating a state of the guide plate in a state in which the charging door is opened in the charging door assembly of a vehicle according to the present disclosure.

Figure 9:
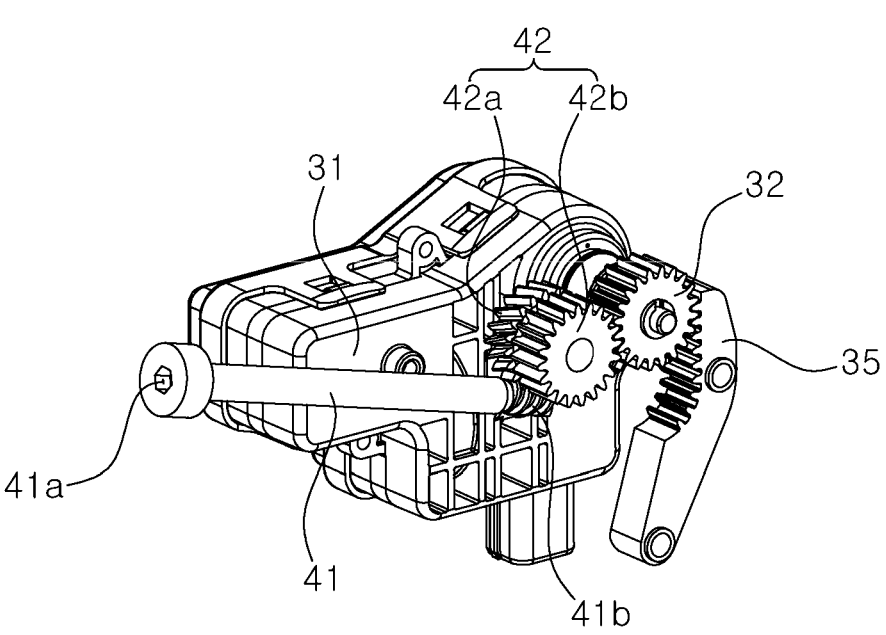

FIG. 9 is a perspective view illustrating installation states of a release shaft and a release gear in the charging door assembly of a vehicle according to the present disclosure.

Figure 10:
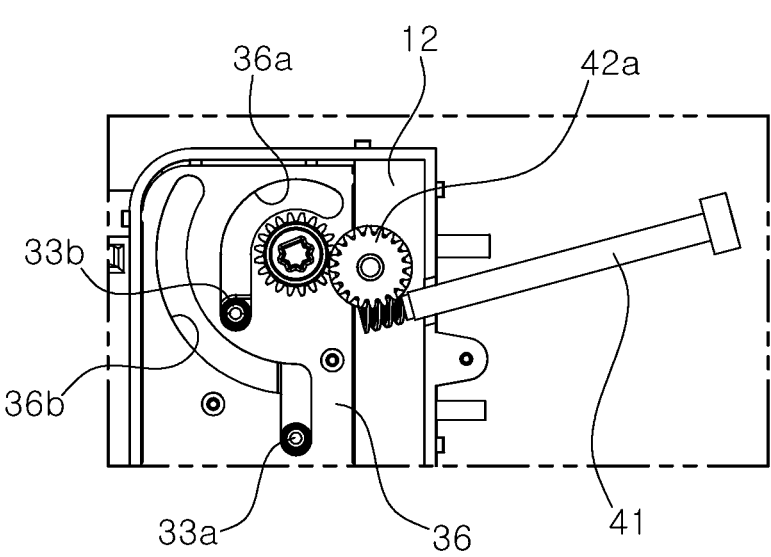

FIG. 10 is a plan view illustrating operating states of the release shaft and the release gear in the charging door assembly of a vehicle according to the present disclosure.

Figure 11:
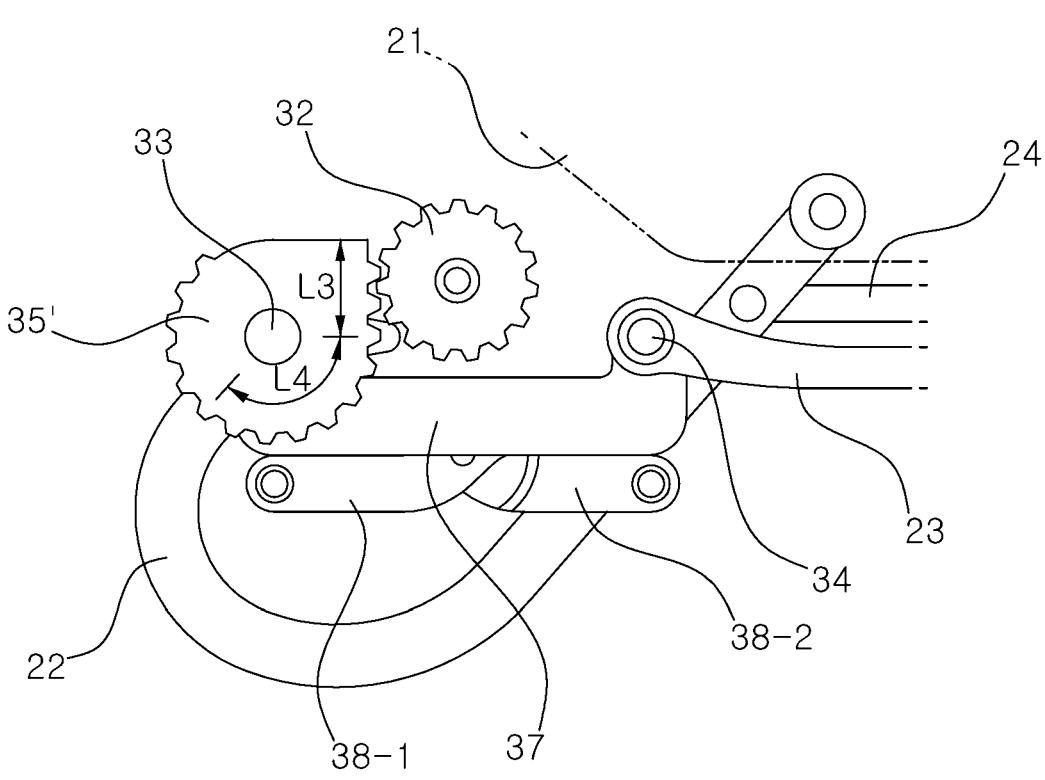

FIG. 11 is a plan view illustrating a driving gear and a guide gear when a charging door is closed in a charging door assembly of a vehicle according to another embodiment of the present disclosure.

Figure 12:
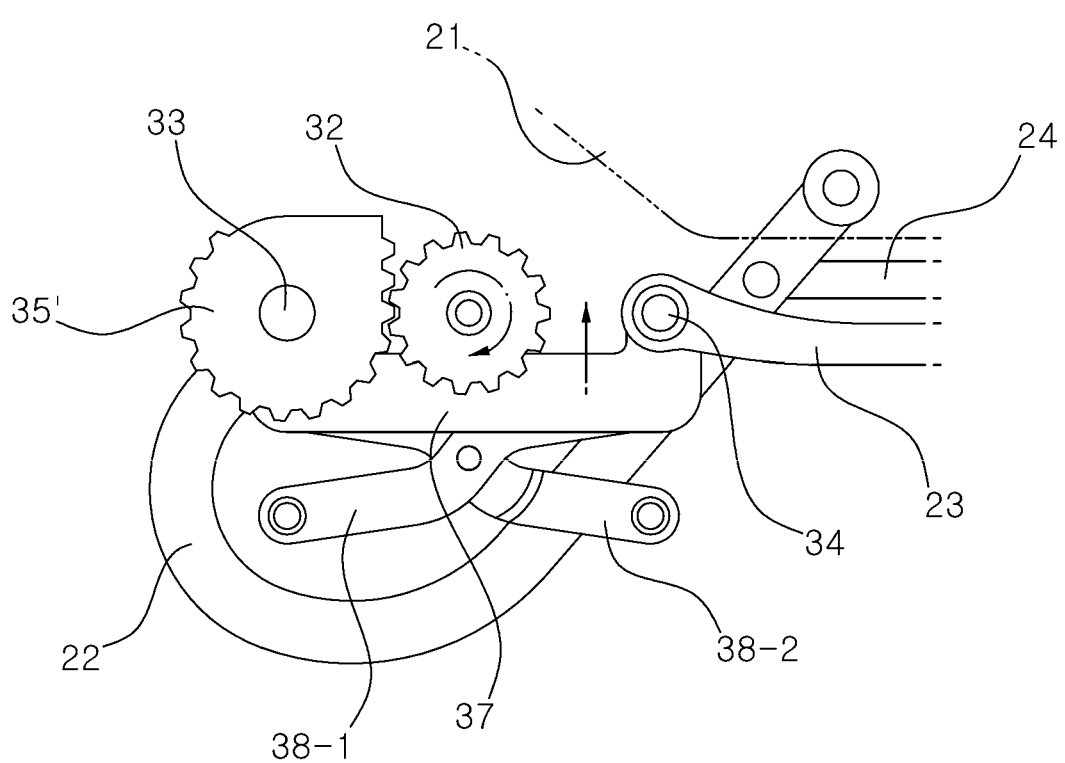

FIG. 12 is a plan view illustrating the driving gear and the guide gear when the charging door is popped up in the charging door assembly of a vehicle according to another embodiment of the present disclosure.

Figure 13:
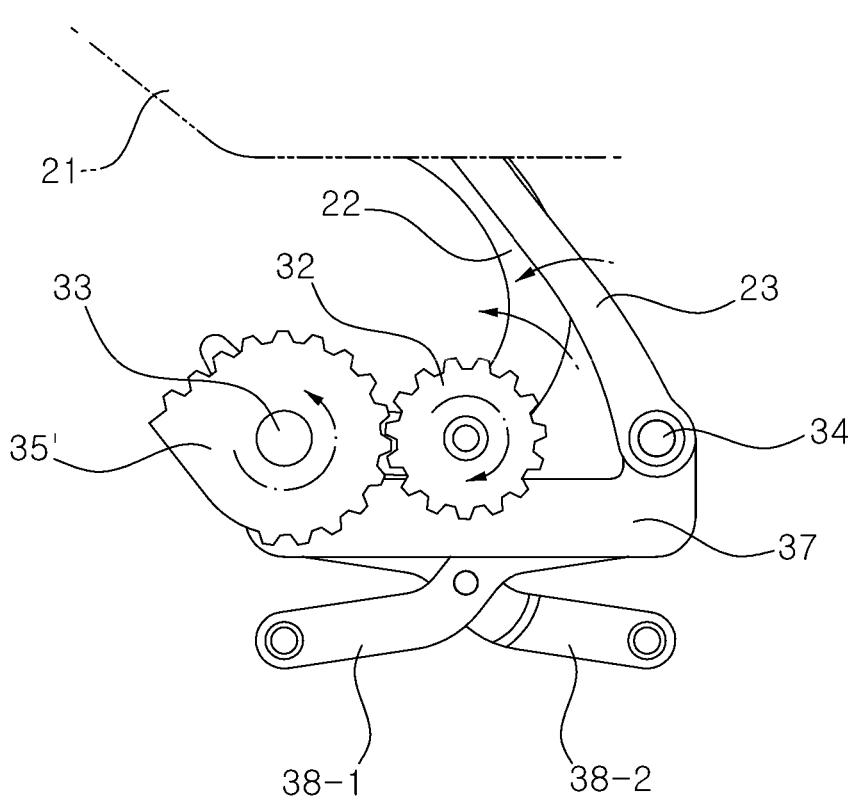

FIG. 13 is a plan view illustrating the driving gear and the guide gear when the charging door is opened in the charging door assembly of a vehicle according to another embodiment of the present disclosure.

DESCRIPTION OF SPECIFIC EMBODIMENTS

Hereinafter, a charging door assembly of a vehicle according to the present disclosure will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The charging door assembly of a vehicle according to the present disclosure may include a charging door 21 configured to open and close a charging port 11a formed on a panel 11 of a vehicle body, a main link 22 hinge-coupled to the vehicle body and an inner surface of the charging door 21, and a sub-link 23 having one end hinge-coupled to the vehicle body and the other end hinge-coupled to the inner surface of the charging door 21 at a position spaced apart from the main link 22. After the charging door 21 is moved to the outside of the panel 11, the inner surface of the charging door 21 may be opened while maintaining a state within a predetermined distance from the panel 11.

The charging door 21 may open and close the charging port 11a formed on one side of the vehicle body of a vehicle. The charging port 11a is formed to pass through the panel 11 constituting the vehicle body, the charging door 21 closes the charging port 11a as usual. And during charging, the charging door 21 opens the charging port 11a to expose a charging connector (not shown). After the charging door 21 is popped up from the panel 11 to the outside of the panel 11 from a state of closing the charging port 11a, the charging door 21 opens so that the inner surface of the charging door 21 is substantially parallel to the panel 11 while maintaining a position within a predetermined distance from the panel 11.

A base 12 may be fixed to one side of the vehicle body, and components, which will be described below, may be accommodated inside the base 12. A slit 12a for guiding operations of pop-up operating links 38-1 and 38-2 is formed in the base 12, guide grooves 12b for guiding a driving shaft 33 and a sub-shaft 34 are formed in parallel, and a through-hole 12c is formed to expose a closure 22a to the outside in an initial state.

The cover 13 may be fastened to the base 12 to cover one side of the base 12 and covers the components located inside the base 12. Due to the base 12 and the cover 13, foreign materials are prevented from flowing into an interior of the base 12 so that malfunction may be prevented.

Since the components are accommodated in a space formed by the base 12 and the cover 13, the components may be installed while preventing malfunction during operation by foreign materials.

One end of the main link 22 may be hinge-coupled to the vehicle body, and the other end thereof may be hinge-coupled to the inner surface of the charging door 21. The main link 22 is formed in the shape of a goose neck so that, when the main link 22 is operated, interference with other components is avoided.

One end of the sub-link 23 may be hinge-coupled to the vehicle body, and the other end thereof may be hinge-coupled to the inner surface of the charging door 21 at a position of the sub-link 23 spaced apart from the main link 22.

The charging door 21, the main link 22, the sub-link 23, and the vehicle body may constitute a four-bar link to open the charging door 21.

Here, the main link 22 and the sub-link 23 may not be directly hinge-coupled to the vehicle body but may be connected to the vehicle body through a pop-up operating bar 37 and pop-up operating links 38-1 and 38-2, which will be described below.

The closure 22a may be formed on one side of the main link 22 to cover the through-hole 12c when the charging door 21 is opened.

In order to support the charging door 21 when the charging door 21 is opened, a first support link 24 and a second support link 25 may be installed.

One end of the first support link 24 may be hinge-coupled to one side of the main link 22.

One end of the second support link 25 may be hinge-coupled to the other end of the first support link 24, and the other end thereof may be hinge-coupled to the inner surface of the charging door 21.

The charging door 21, the main link 22, the first support link 24, and the second support link 25 may be also formed in the structure of a four-bar link, thereby supporting the charging door 21 and allowing the charging door 21 to maintain a state parallel to the panel 11 when the charging door 21 is opened and closed.

A driving motor 31 may provide power required for an opening or closing operation of the charging door 21. The driving motor 31 is installed on the base 12 or the cover 13 and, when power is input to the driving motor 31, the driving motor 31 generates power required for opening or closing the charging door 21.

A driving gear 32 may be installed on an output shaft 31a of the driving motor 31.

In addition, a rotation amount of the driving motor 31 may be controlled so that an opening angle of the charging door 21 may be controlled.

A pop-up operating part may be provided, and thus one end of the main link 22 and one end of the sub-link 23 may be hinge-coupled to the pop-up operating part, and the charging door 21 may be popped up to a predetermined height from the panel 11 toward the outside of the panel 11.

The pop-up operating part may include a pair of the pop-up operating links 38-1 and 38-2 which may be hinge-coupled while middle portions thereof intersect with each other, and the pop-up operating bar 37 to which the main link 22 and the sub-link 23 may be hinge-coupled and which may be popped up by interlocking with the pair of the pop-up operating links 38-1 and 38-2 according to angle changes thereof.

At an initial opening of the charging door 21, the pop-up operating bar 37 may be popped up from the panel 11 to the outside thereof and allows one end of the main link 22 to be hinge-coupled to one end of the sub-link 23.

In order to pop the charging door 21 up, the pop-up operating bar 37 may be installed to be movable on the base 12 by a predetermined distance. That is, the pop-up operating bar 37 is installed on the base 12 using the pair of the pop-up operating links 38-1 and 38-2.

Figure 7A:
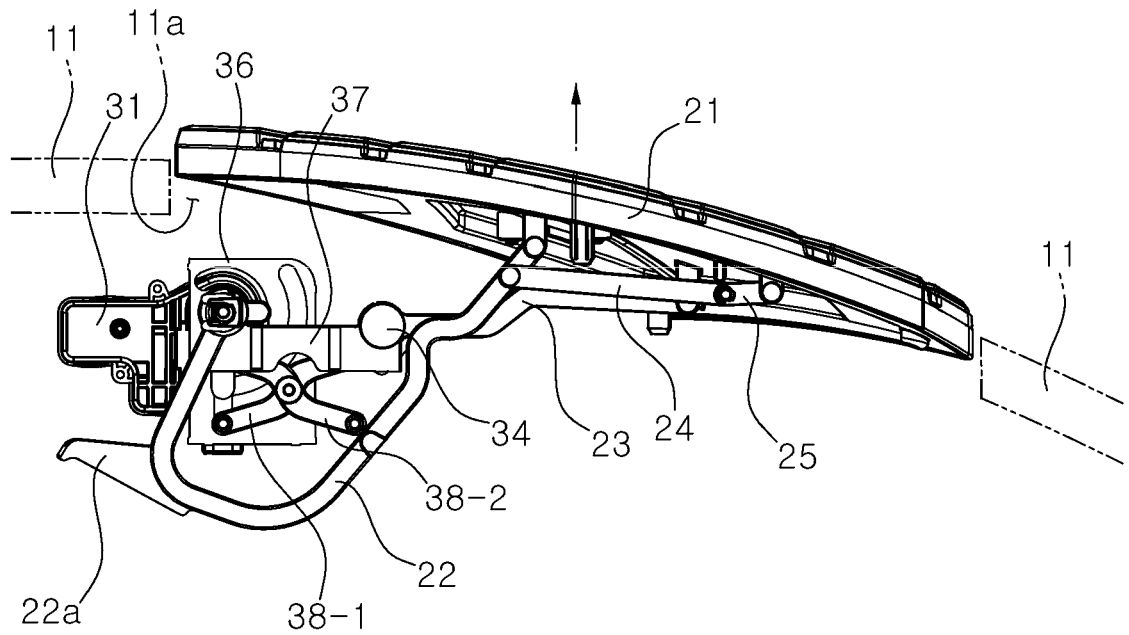
FIG. 7A is a plan view illustrating a state in which the charging door in the charging door assembly of a vehicle is popped up according to the present disclosure.
Figure 7B:
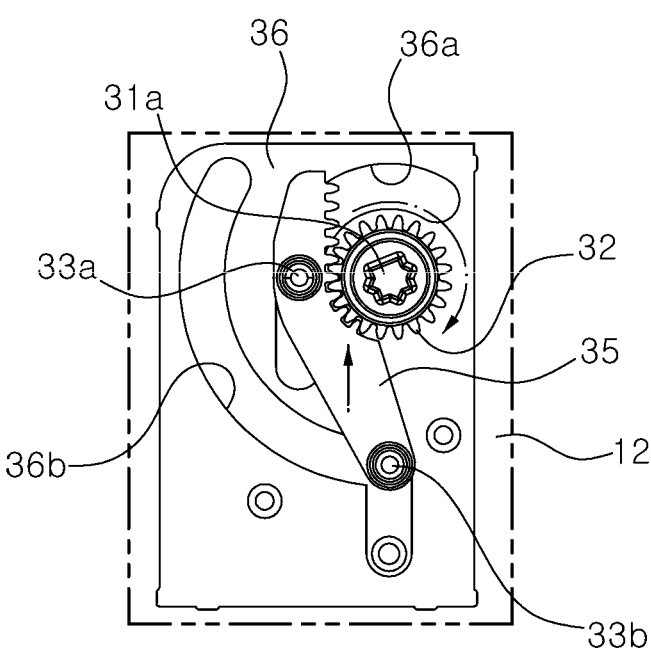
FIGS. 7B and 7C are plan views illustrating states of the guide plate and the pop-up operating bar in the state in which the charging door in the charging door assembly of a vehicle is popped up according to the present disclosure.
Figure 7C:
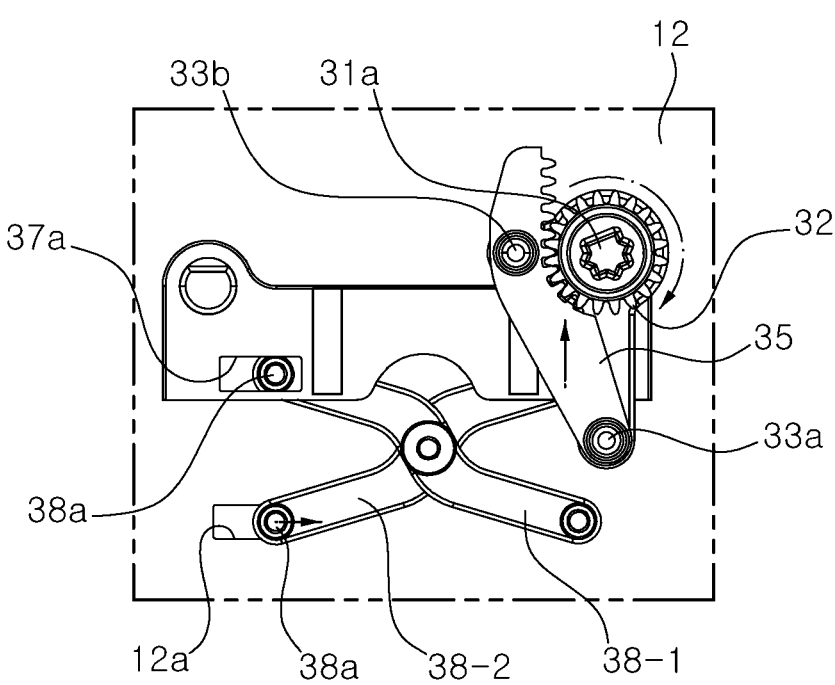

The pop-up operating links 38-1 and 38-2 may be provided as a pair and may be disposed in an X shape so that middle portions thereof intersect each other. One end of each of the pair of pop-up operating links 38-1 and 38-2 is hinge-coupled to the base 12. In addition, the other end of each of the pair of pop-up operating links 38-1 and 38-2 is hinge-coupled to the pop-up operating bar 37. In addition, the pair of pop-up operating links 38-1 and 38-2 are hinge-coupled to each other at an intersection portion. For example, the pop-up operating links 38-1 and 38-2 are provided as a first pop-up operating link 38-1 and a second pop-up operating link 38-2 of which middle portions are hinge-coupled to each other, and the first pop-up operating link 38-1 and the second pop-up operating link 38-2 are disposed in an X-shape to intersect and are hinge-coupled at the intersection portion. According to the above structure, as the first pop-up operating link 38-1 and the second pop-up operating link 38-2 are deployed (see FIG. 7C) from a folded state (see FIG. 4C), the pop-up operating bar 37 becomes from the state of FIG. 4C to the state of FIG. 7C to pop the charging door 21 up.

Meanwhile, in order to allow the first pop-up operating link 38-1 and the second pop-up operating link 38-2 to be operated in the folded state and the unfolded state, slits 12a and 37a may be formed in the base 12 and the pop-up operating bar 37 on the vehicle body, respectively. That is, one end of the first pop-up operating link 38-1 and one end of the second pop-up operating link 38-2 are each hinge-coupled to the vehicle body, and the other end of the first pop-up operating link 38-1 and the other end of the second pop-up operating link 38-2 are each hinge-coupled to the pop-up operating bar 37. When the pop-up operating bar 37 is popped up, the other end of the first pop-up operating link 38-1 and the other end of the second pop-up operating link 38-2 are hinge-coupled to slide in a direction perpendicular to a pop-up direction of the pop-up operating bar 37. In this case, in order to allow the other end of the first pop-up operating link 38-1 and the other end of the second pop-up operating link 38-2 to slide, the slits 12a and 37a are formed in the base 12 and the pop-up operating bar 37, respectively. Thus, in order to pop the pop-up operating bar 37 up or return the pop-up operating bar 37 from the popped-up state, when the first pop-up operating link 38-1 and the second pop-up operating link 38-2 are operated, ends of the pop-up operating links 38-1 and 38-2 slide inside the slits 12a and 37a.

In order to connect one end of the main link 22 and one end of the sub-link 23 to the pop-up operating bar 37, the driving shaft 33 and the sub-shaft 34 may be provided.

The driving shaft 33 may pass through one end of the main link 22 and one side of the pop-up operating bar 37 to hinge-couple the main link 22 to the pop-up operating bar 37.

In addition, the sub-shaft 34 may pass through one end of the sub-link 23 and the other side of the pop-up operating bar 37 to hinge-couple the sub-link 23 to the pop-up operating bar 37. When the pop-up operating bar 37 is moved together with the driving shaft 33, the sub-shaft 34 guides a linear movement of the pop-up operating bar 37 at a side opposite to the driving shaft 33.

The driving shaft 33 and the sub-shaft 34 may pass through the pop-up operating bar 37 at positions spaced apart from each other.

In a state in which the base 12, the pair of pop-up operating links 38-1 and 38-2, and the pop-up operating bar 37, which are fastened to the vehicle body, may be configured to allow the pop-up operating bar 37 to be moved for popping up by a predetermined distance from the base 12, since the charging door 21, the main link 22, the sub-link 23, and the pop-up operating bar 37 constitute a four-bar link, after the charging door 21 is popped up due to the movement of the pop-up operating bar 37, the charging door 21 is opened due to a structure of the four-bar link.

A guide groove 12b may be formed in the base 12 to pop the charging door 21 up and move the driving shaft 33 and the sub-shaft 34 when the pop-up operating bar 37 is moved. In order to guide movement of the driving shaft 33 and the sub-shaft 34, the guide groove 12b is formed as a plurality of guide grooves 12b in parallel at positions spaced apart from each other.

In order to open the charging door 21 after popped up from the panel 11, a guide gear and a guide plate 36 may be provided.

The guide gear 35 may be engaged with the driving gear 32 and may be operated by the driving motor 31. While the guide gear 35 is operated by the driving motor 31, the guide gear 35 sequentially performs a movement operation of moving the driving shaft 33 by a predetermined distance and a rotation operation of rotating the driving shaft 33. When the movement operation is performed, the guide gear 35 pops the charging door 21 up, and when the rotation operation is performed, the guide gear 35 opens the charging door 21.

The guide gear 35 may be connected to a first guide bar 33a and a second guide bar 33b integrally formed with the driving shaft 33 at positions spaced apart from each other. The first guide bar 33a and the second guide bar 33b are formed integrally with the driving shaft 33 at an end of the driving shaft 33 in parallel with the driving shaft 33, and the first guide bar 33a and the second guide bar 33b are connected to the guide gear 35 so that the guide gear 35 and the driving shaft 33 are integrally operated.

In addition, the guide gear 35 may be formed to have a predetermined length, and a gear portion 35a may be formed only in a partial section to be engaged with the driving gear 32. In a state in which the guide gear 35 is engaged with the driving gear 32, due to an input of a rotating force from the driving gear 32 and a guidance of the first guide bar 33a and the second guide bar 33b by the guide plate 36, the guide gear 35 pops the charging door 21 up and then opens the charging door 21 or the guide gear 35 performs vice versa.

Figure 5:
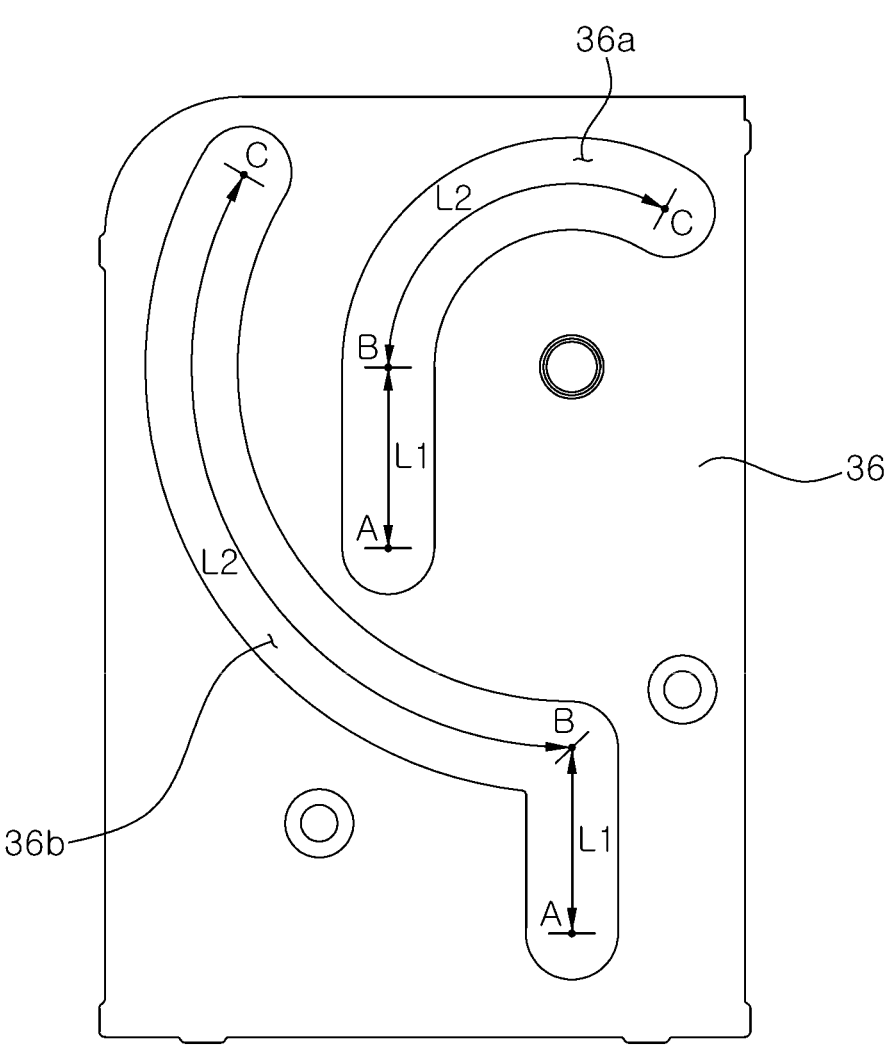
FIG. 5 is a plan view illustrating the guide plate of the charging door assembly of a vehicle according to the present disclosure.
Figure 6:
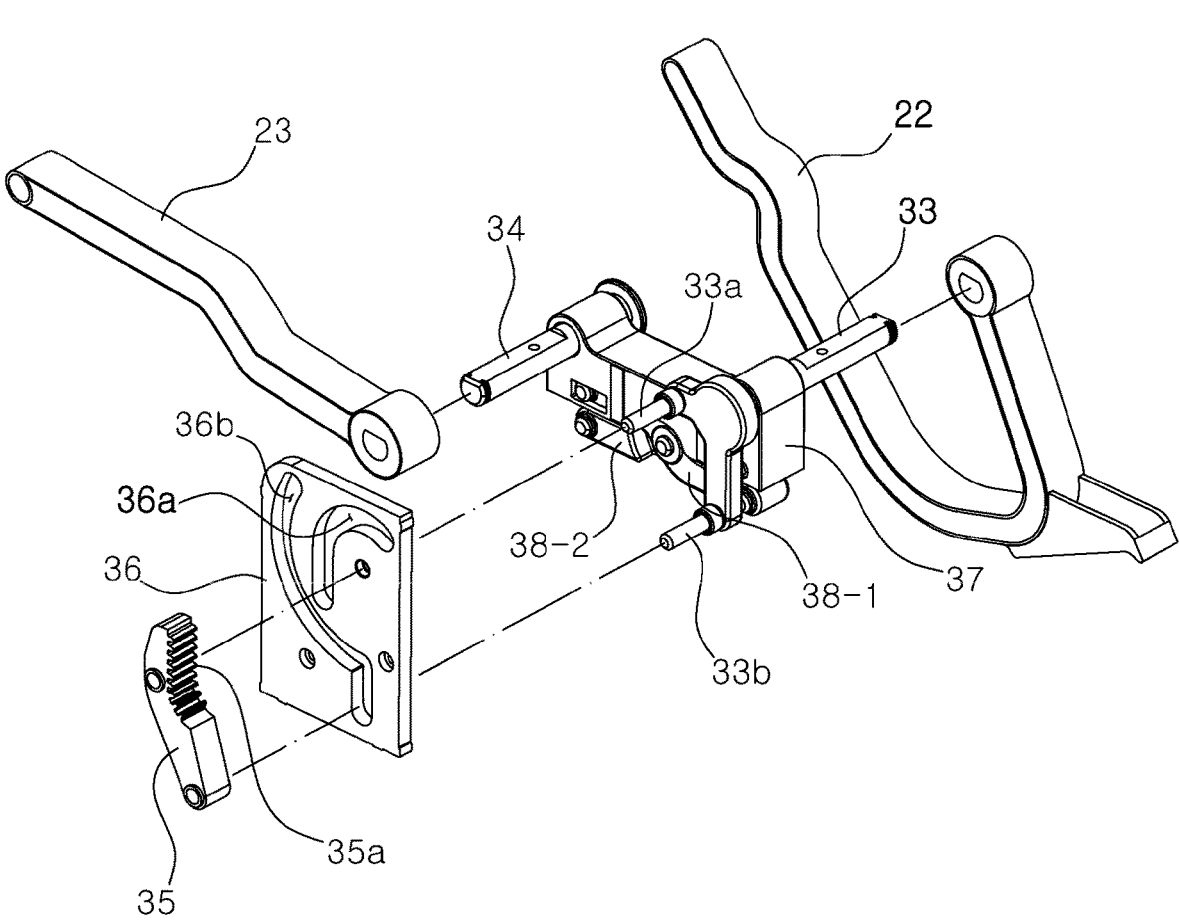
FIG. 6 is an exploded perspective view illustrating a coupling relationship of the guide plate, a guide gear, and the pop-up operating bar in the charging door assembly of a vehicle according to the present disclosure.

Guide grooves 36a and 36b may be formed in the guide plate 36, wherein the first guide bar 33a and the second guide bar 33b may pass through the guide grooves 36a and 36b, and the guide grooves 36a and 36b may guide operations of the first guide bar 33a and the second guide bar 33b. The guide grooves 36a and 36b include a first guide groove 36a for guiding the first guide bar 33a and a second guide groove 36b for guiding the second guide bar 33b. The first guide groove 36a and the second guide groove 36b guide the first guide bar 33a and the second guide bar 33b to move the guide gear 35 in a predetermined trajectory so that the guide gear 35 sequentially performs the movement operation and the rotation operation. A specific shape of each of the first guide groove 36a and the second guide groove 36b has a shape shown in FIG. 5. A straight section L1 and a rotating section L2 are continuously formed in each of the first guide groove 36a and the second guide groove 36b. The straight section L1 guides the first guide bar 33a and the second guide bar 33b to perform a rectilinear movement from A to B to allow the driving shaft 33 to perform a rectilinear movement. The pop-up operating bar 37 also performs a rectilinear movement due to the rectilinear movement of the driving shaft 33, and thus the main link 22 and one end of the sub-link 23 also perform a rectilinear movement so that the charging door 21 is popped up. The rotating section L2 guides the first guide bar 33a and the second guide bar 33b to perform a rotation movement from B to C. The rotating section L2 is formed in the same direction in the first guide groove 36a and the second guide groove 36b, and the rotating section L2 formed in the first guide groove 36a and the rotating section L2 formed in the second guide groove 36b become each substantially a portion of a concentric circle.

Meanwhile, when the charging door 21 cannot be opened due to a failure of the driving motor 31 or the like, a release shaft 41 and a release gear 42 may be provided to manually open the charging door 21.

The release shaft 41 may be manipulated by a user, and thus a rotating force may be input. For example, one end of the release shaft 41 may be directly rotated, or the release shaft 41 may be rotated using a tool. A tool connector 41a may be formed at one end of the release shaft 41 to allow the tool to be connected thereto.

One side of the release gear 42 may be engaged with the other end of the release shaft 41, and the other side thereof may be engaged with the driving gear 32. In order to transmit the rotating force, which is input to the release shaft 41, to the driving gear 32, the release gear 42 is engaged with the release shaft 41 and the driving gear 32. A worm gear 41b is formed at the other end of the release shaft 41 and is engaged with one side of the release gear 42. In addition, the other side of the release gear 42 is engaged with the driving gear 32, and when the user manipulates the release shaft 41, the driving gear 32 may be rotated to open the charging door 21. A portion of the release gear 42 engaged with the worm gear 41b of the release shaft 41 may be formed as a helical gear, and a portion thereof engaged with the driving gear 32 may be formed as a spur gear.

An operation of the charging door assembly of a vehicle, which has the above configuration, according to the present disclosure will be described as follows.

Figure 1:
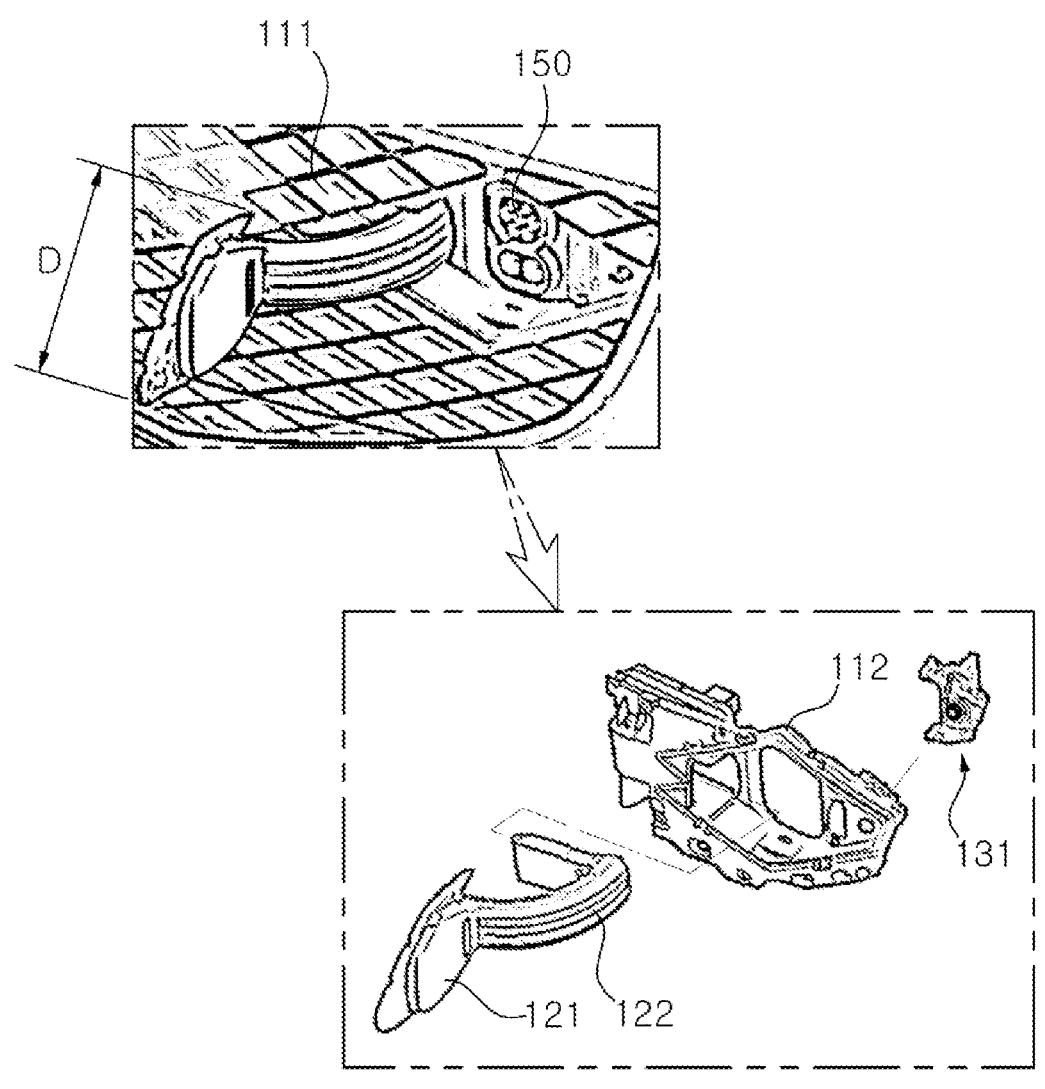
FIG. 1 is a schematic diagram illustrating a charging door assembly according to the related art.
Figure 3:
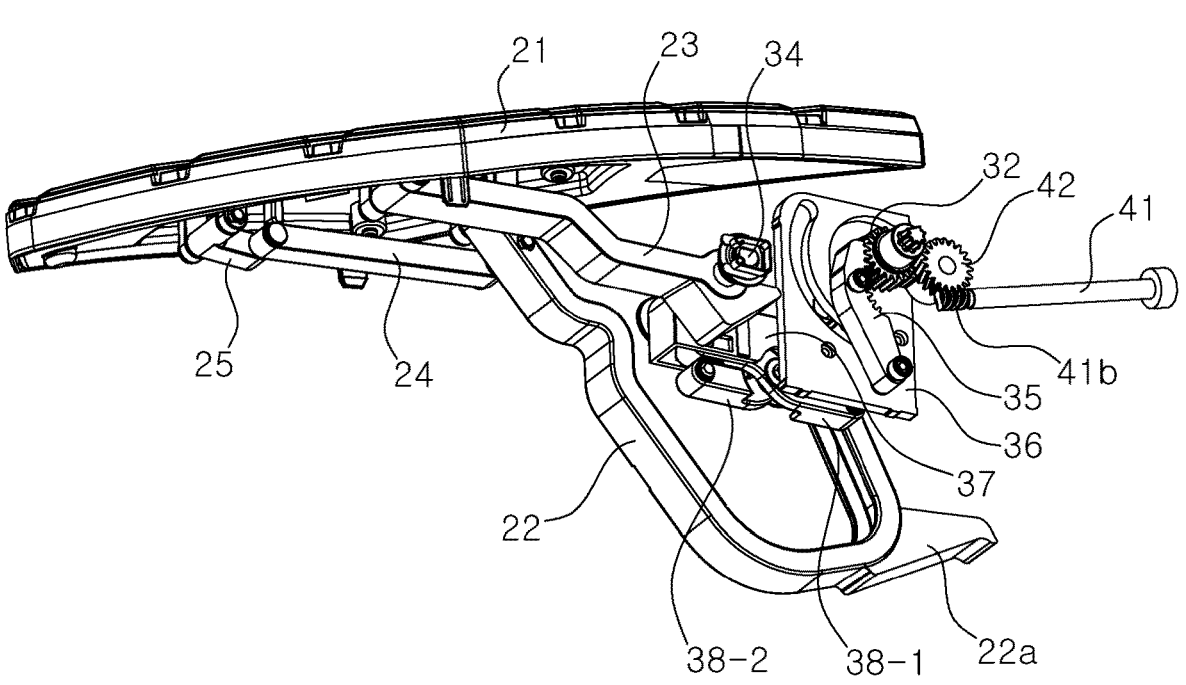
FIG. 3 is a perspective view illustrating a state in which a base is removed from the charging door assembly of a vehicle according to the present disclosure.
Figure 4A:
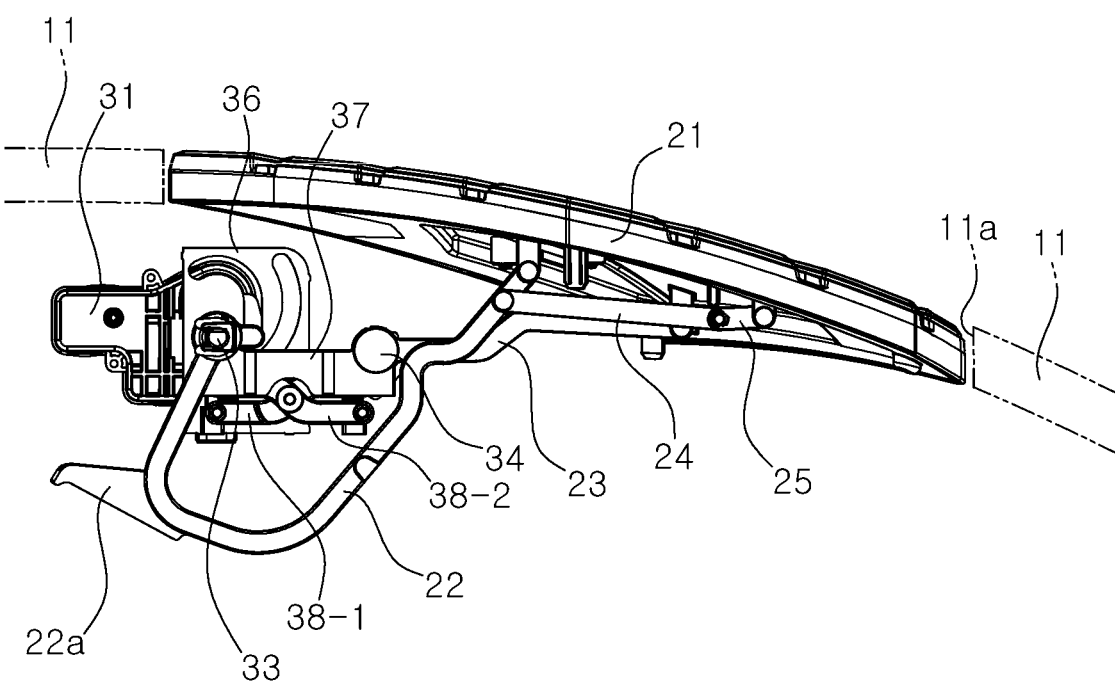
FIG. 4A is a plan view illustrating a state in which a charging door in the charging door assembly of a vehicle is closed according to the present disclosure.
Figure 4B:
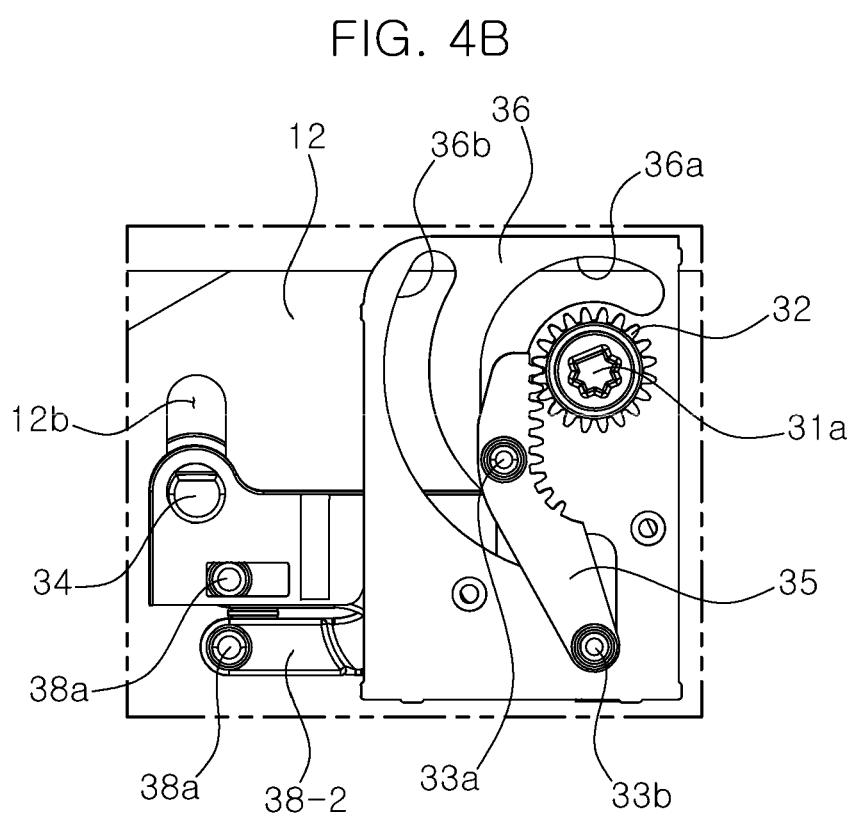
Figure 4C:
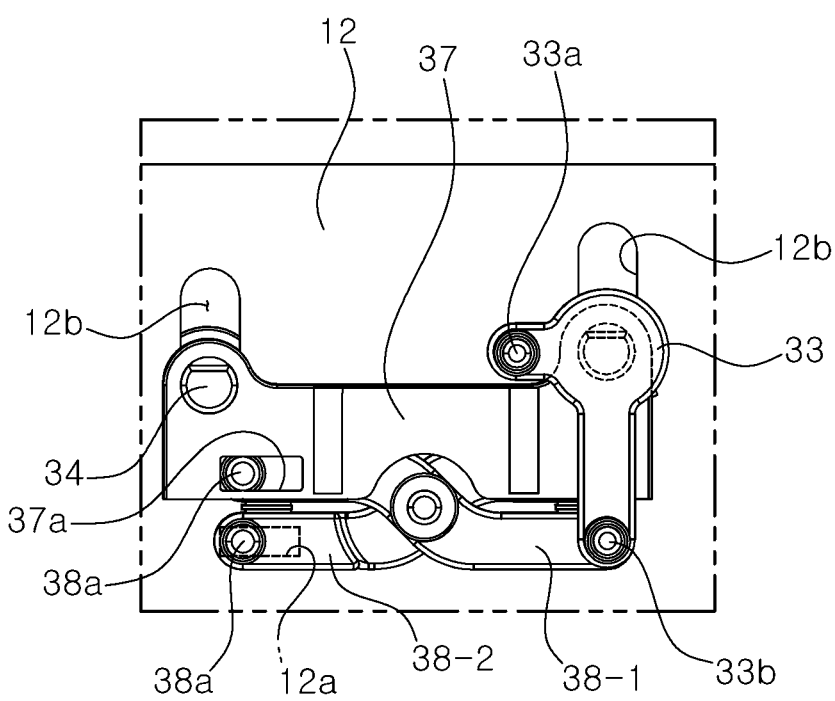

FIGS. 4A to 4C show a state in which the charging door 21 is closed.

From the above state, when an open signal of the charging door 21 is input to the driving motor 31, the charging door 21 may become a popped-up state as shown in FIGS. 5A to 5C. When the driving motor 31 is operated and thus the driving gear 32 is rotated, the guide gear 35 is operated by the driving gear 32. Since the first guide bar 33a and the second guide bar 33b connected to the guide gear 35 are constrained to the first guide groove 36a and the second guide groove 36b, the guide gear 35 is not rotated and is moved by the straight sections L1 formed in the first guide groove 36a and the second guide groove 36b. When the first guide bar 33a and the second guide bar 33b are each moved from position A to position B of the straight section L1, the driving shaft 33 is moved by as much as a length of the straight section L1 according to the displacement.

As the driving shaft 33 is moved, the pop-up operating bar 37 may be also moved by as much as the movement of the driving shaft 33, and one end of the main link 22 and one end of the sub-link 23 may be hinge-coupled to the pop-up operating bar 37 through the driving shaft 33 and the sub-shaft 34 so that the charging door 21 is popped up.

Meanwhile, when the driving motor 31 is continuously operated from a state in which the charging door 21 is popped up, the charging door 21 may fully open the charging port 11a (see FIGS. 8A and 8B).

When the driving motor 31 is continuously operated, the driving gear 32 may continuously operate the guide gear 35. When the popping-up of the charging door 21 is completed, the first guide bar 33a and the second guide bar 33b are located at positions B in the first guide groove 36a and the second guide groove 36b, at which the straight section L1 is terminated and the rotating section L2 is started. Since the driving gear 32 continuously operates the guide gear 35, the first guide bar 33a and the second guide bar 33b are moved from positions B to positions C in the first guide groove 36a and the second guide groove 36b along the rotating section L2. In this case, the guide gear 35 and the driving shaft 33 are also rotated together. When the driving shaft 33 is rotated, the main link 22 hinge-coupled to the driving shaft 33 is rotated, and due to the rotation of the main link 22, the charging door 21 is opened. When the main link 22 is rotated, the charging door 21 and the sub-link 23 are rotated, and the charging door 21 is moved while maintaining a state substantially parallel to the panel 11, thereby opening the charging port 11a formed in the panel 11. Since the charging door 21 is opened while maintaining a state parallel to the panel 11, a protruding amount D of the charging door 21 is significantly reduced when compared to a case in which the charging door 21 is connected through the gooseneck hinge.

In this way, in a state in which the charging door 21 is fully opened, when the driving motor 31 is operated in a reverse order to that of opening, the charging door 21 may be operated in the reverse order of opening and is closed.

FIGS. 11 and 12 show a charging door assembly of a vehicle according to another embodiment of the present disclosure.

In the present embodiment, instead of the guide gear 35 and the guide plate 36, an external gear 35' which is engaged with the driving shaft 33 and rotates after moved by as much as a predetermined length may be provided.

That is, a straight section L3 may be formed in a partial section of the external gear 35' and may be elongated to form a rotating section L4.

In the straight section L3, the external gear 35' may perform a rectilinear movement by the driving gear 32 and move the pop-up operating bar 37 to move one end of the main link 22 and one end of the sub-link 23, thereby popping the charging door 21 up (see FIG. 12).

Thereafter, in the rotating section L4, the external gear 35' may be rotated by the driving gear 32 and rotate the driving shaft 33 to rotate the main link 22, thereby rotating the charging door 21 (see FIG. 13).

In accordance with a charging door assembly of a vehicle according to the present disclosure, which has the above-described configuration, when a charging door is opened, the charging door may be separated from a panel of a vehicle body and then may be moved to be adjacent to the panel by a link structure. Thus, even when a size of the charging door is increased according to the advancement of a charging connector, when the charging door is opened, a protruding amount of the charging door cannot be increased.

Since the protruding amount of the charging door is not increased, the risk of damage due to the increase of the protruding amount of the charging door can be reduced.

In addition, since the charging door is supported by a plurality of links, rigidity can be improved when the charging door is opened.

While the present disclosure has been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

What is claimed is:

1. A charging door assembly of a vehicle, comprising:
a charging door configured to open and close a charging port formed in a panel of a vehicle body;
a main link respectively hinge-coupled to the vehicle body and an inner surface of the charging door;
a sub-link respectively hinge-coupled to the vehicle body and the inner surface of the charging door at a position spaced apart from the main link; and
a pop-up operating part hinge-coupled to one end of the main link and one end of the sub-link and, and configured to pop the charging door up from the panel toward the outside of the panel;
wherein the charging door is configured to be moved to the outside of the panel, and then is configured to be opened while maintaining a state in which the inner surface of the charging door is located within a predetermined distance from the panel.

2. The charging door assembly of claim 1, wherein the pop-up operating part comprises:
a first pop-up operating link and a second pop-up operating link of which middle portions are hinge-coupled while intersecting each other; and
a pop-up operating bar hinge-coupled to the main link and the sub-link, and popped up while interlocking with the first pop-up operating link and the second pop-up operating link according to an angle change therebetween.

3. The charging door assembly of claim 2, wherein:
one end of the first pop-up operating link and one end of the second pop-up operating link are each hinge-coupled to the vehicle body; and
the other end of the first pop-up operating link and the other end of the second pop-up operating link are each hinge-coupled to the pop-up operating bar,
wherein, when the pop-up operating bar is popped up, the other end of the first pop-up operating link and the other end of the second pop-up operating link are hinge-coupled to slide in a direction perpendicular to a pop-up direction of the pop-up operating bar.

4. The charging door assembly of claim 3, wherein a slit is formed in the pop-up operating bar to guide the other end of the first pop-up operating link to be guided by the slit.

5. The charging door assembly of claim 2, further comprising:
a driving shaft configured to pass through one end of the main link and one side of the pop-up operating bar to hinge-couple the main link to the pop-up operating bar; and
a sub-shaft configured to pass through one end of the sub-link and the other side of the pop-up operating bar to hinge-couple the sub-link to the pop-up operating bar.

6. The charging door assembly of claim 5, further comprising:
a driving motor configured to rotate the driving shaft.

7. The charging door assembly of claim 6, further comprising:
a driving gear rotated by the driving motor; and a guide gear engaged with the driving gear and configured to sequentially perform a movement operation for moving the driving shaft by as much as a predetermined distance and a rotation operation for rotating the driving shaft.

8. The charging door assembly of claim 7, further comprising:
a first guide bar and a second guide bar connected to positions spaced apart from each other of the guide gear at an end of the driving shaft and integrally formed with the driving shaft to be parallel thereto; and
a guide plate in which a guide groove is formed to allow the guide gear to sequentially perform the movement operation and the rotation operation.

9. The charging door assembly of claim 8, wherein a gear portion is formed in a partial section of the guide gear, wherein the gear portion is formed to have a predetermined length and engaged with the driving gear.

10. The charging door assembly of claim 8, wherein:
a first guide groove configured to guide the first guide bar and a second guide groove configured to guide the second guide bar are formed in the guide plate; and
a straight section for a movement operation of the driving shaft and a rotating section for a rotation operation of the driving shaft are continuously formed in each of the first guide groove and the second guide groove.

11. The charging door assembly of claim 1, further comprising:
a first support link having one end hinge-coupled to one side of the main link; and
a second support link having one end connected to the other end of the first support link and the other end hinge-coupled to the inner surface of the charging door.

12. The charging door assembly of claim 7, further comprising:
a release shaft manipulated by a user; and
a release gear respectively engaged with the release shaft and the driving gear and, configured to transmit a rotating force, which is input from the release shaft, to the driving gear.

13. The charging door assembly of claim 6, further comprising:
a driving gear rotated by the driving motor; and
an external gear engaged with the driving gear and configured to sequentially perform a movement operation for moving the driving shaft by as much as a predetermined distance and a rotation operation for rotating the driving shaft.

14. The charging door assembly of claim 13, wherein a straight section for moving the external gear by as much as a predetermined distance due to the rotation of the driving gear is formed on a partial outer portion of the external gear, and a rotating section for rotating the external gear is formed to be connected to the straight section in the external gear.

15. The charging door assembly of claim 2, further comprising:
a base which is fixed to the vehicle body, in which a space is formed, and which accommodates a portion in which the main link and the sub-link are connected to the vehicle body.

16. The charging door assembly of claim 15, further comprising:
a cover configured to cover the base.

17. The charging door assembly of claim 15, wherein a slit is formed in the base to guide one end of the second pop-up operating link to be guided by the slit.

18. A charging door assembly of a vehicle, comprising:

a charging door configured to open and close a charging port formed in a panel of a vehicle body;

a main link hinge-coupled to the vehicle body and an inner surface of the charging door;

a sub-link hinge-coupled to the vehicle body and the inner surface of the charging door at a position spaced apart from the main link;

a driving shaft to which one end of the main link is hinge-coupled;

a driving gear rotated by a driving motor;

a guide gear engaged with the driving gear and connected to positions spaced apart from each other at an end of the driving shaft so as to sequentially perform a movement operation for moving the driving shaft by as much as a predetermined distance and a rotation operation for rotating the driving shaft, wherein a first guide bar and a second guide bar are integrally formed with the driving shaft to be parallel thereto; and a guide plate in which a guide groove is formed to allow the guide gear to sequentially perform the movement operation and the rotation operation.

19. A vehicle comprising the charging door assembly of claim 1.

* * * * *